United States Patent
Da Silva et al.

(10) Patent No.: US 11,647,225 B2
(45) Date of Patent: May 9, 2023

(54) METHOD FOR FOUR-DIMENSIONAL INTRA-PREDICTION CODING AND DECODING OF LIGHT FIELD DATA

(71) Applicants: SAMSUNG ELETRÔNICA DA AMAZÔNIA LTDA., São Paulo (BR); UNIVERSIDADE FEDERAL DO RIO DE JANEIRO, Rio de Janeiro (BR)

(72) Inventors: Eduardo Antônio Barros Da Silva, Rio de Janeiro (BR); Murilo Bresciani De Carvalho, Rio de Janeiro (BR); Carla Liberal Pagliari, Rio de Janeiro (BR); Marcio Pinto Pereira, Rio de Janeiro (BR); Gustavo De Oliveira E Alves, Rio de Janeiro (BR); Fernando Manuel Bernardo Pereira, Lisbon (PT); Carla Florentino Schueler, Niterói (BR); Vanessa Testoni, Campinas (BR); Ismael Seidel, Campinas (BR); Pedro Garcia Freitas, Campinas (BR)

(73) Assignees: SAMSUNG ELETRÔNICA DA AMAZÔNIA LTDA., Campinas (BR); UNIVERSIDADE FEDERAL DO RIO DE JANEIRO, Rio de Janeiro (BR)

( * ) Notice: Subject to any disclaimer, the term of this patent is extended or adjusted under 35 U.S.C. 154(b) by 0 days.

(21) Appl. No.: 17/352,691

(22) Filed: Jun. 21, 2021

(65) Prior Publication Data
US 2022/0377374 A1 Nov. 24, 2022

(30) Foreign Application Priority Data
May 13, 2021 (BR) ...................... 10 2021 009291-2

(51) Int. Cl.
*H04N 19/593* (2014.01)
*H04N 19/186* (2014.01)
(Continued)

(52) U.S. Cl.
CPC .......... *H04N 19/593* (2014.11); *H04N 19/11* (2014.11); *H04N 19/176* (2014.11); *H04N 19/186* (2014.11); *H04N 19/597* (2014.11)

(58) Field of Classification Search
CPC .... H04N 19/593; H04N 19/11; H04N 19/176; H04N 19/186; H04N 19/597
See application file for complete search history.

(56) References Cited

U.S. PATENT DOCUMENTS

| 10,531,082 B2 | 1/2020 | Liang |
| 10,687,068 B1 | 6/2020 | Barros Da Silva et al. |

(Continued)

FOREIGN PATENT DOCUMENTS

EP 3579561 A1 * 12/2019 ........... H04N 19/105

OTHER PUBLICATIONS

Lingjun Li et al., "Macropixel-constrained Collocated Position Search for Plenoptic Video Coding", Downloaded on Aug. 16, 2020 from IEEE Xplore, 4 pages.
(Continued)

*Primary Examiner* — Francis Geroleo
(74) *Attorney, Agent, or Firm* — Staas & Halsey LLP

(57) ABSTRACT

The present invention relates to a prediction-based technique for encoding light field data by removing redundant information of light field data, reducing a number of bits by employing a prediction of a pixel value in all four dimensions of the light field. Using this technique to represent light field data, allows it to be transferred through a limited-bandwidth medium and/or to significantly reduce the required storage capacity for this purpose.

14 Claims, 11 Drawing Sheets

(51) Int. Cl.
*H04N 19/176* (2014.01)
*H04N 19/597* (2014.01)
*H04N 19/11* (2014.01)

(56) References Cited

U.S. PATENT DOCUMENTS

2013/0113981 A1* 5/2013 Knight ................. G02B 3/0056
  348/345
2018/0255319 A1* 9/2018 Thoreau ................ G06T 15/205
2018/0316935 A1 11/2018 Boisson et al.
2019/0158877 A1* 5/2019 Thoreau ................. H04N 19/15

OTHER PUBLICATIONS

Monteiro, R. J. et al., "Light field image coding using high-order intrablock prediction", IEEE Journal of Selected Topics in Signal Processing, 2017, 11 (7), pp. 1120-1131.

Ricardo Monteiro et al., "Light Field HEVC-Based Image Coding Using Locally Linear Embedding and Self-Similarity Compensated Prediction", 2015, IEEE, 4 pages.

Gustavo Alves, "A Study on the 4D Sparsity of JPEG Pleno Light Fields Using the Discrete Cosine Transform", ICIP 2018, 5 pages.

Murilo B. de Carvalho et al., "A 4D DCT-Based Lenslet Light Field Codec", published Oct. 7, 2018, 5 pages.

* cited by examiner

METHOD FOR FOUR-DIMENSIONAL INTRA-PREDICTION CODING AND DECODING OF LIGHT FIELD DATA

CROSS-REFERENCE TO RELATED APPLICATION(S)

This application is based on and claims priority under 35 U.S.C. § 119 to Brazilian Patent Application No. BR 10 2021 009291-2, filed on May 13, 2021, in the Brazilian Intellectual Property Office, the disclosure of which is incorporated by reference herein in its entirety.

TECHNICAL FIELD

The present invention relates to a prediction-based technique for encoding light field data. The proposed technique enhances current light field codecs. It adds value to any system that employs light fields imaging resources in several areas, such as, immersive displays, holographic smartphones, cameras, headsets, AR/VR/MR devices, smartTVs, etc.

The method proposed herein removes redundant information of light field data, reducing its bitrate by employing a prediction of a pixel value in all four dimensions of the light field. Using this technique to represent light field data, allows it to be transferred through a limited-bandwidth medium and/or to significantly reduce the required storage capacity for this purpose.

BACKGROUND

A full description of the light rays present in the space is given by the Plenoptic Function, a theoretical vector function with 7 dimensions that can describe the light intensity passing through every viewpoint, for every direction, wavelength, and time instant. If the spectral information components are considered restricted and it is assumed no variation in time and the intensity of each light ray is constant along its path, the hepta-dimensional (7-D) function can be simplified to a four-dimensional (4D) representation, called a light field. It is possible to use a two-plane or light slab parametrization to describe the light field, defining a ray by its intersection points with two planes, which are usually referred to as image plane (indexed by the (u,v) coordinate pair) and view plane (indexed by the (s,t) coordinate pair). The sampling density of the (s,t) and (u,v) pairs denote the angular resolution and the spatial resolution, respectively.

Patent document US 20190158877 A1, entitled "Method and apparatus for encoding and decoding a light field based image, and corresponding program product", published on May 23, 2019, by Thomson Licensing, presents a method that uses specific properties of the linear structures and Epipolar Plane Image (EPI) to provide unidirectional prediction modes for encoding purposes. It assumes that all pixels being predicted in a block are images of 3D points sharing the same depth. Moreover, this document uses 2D intra prediction in the epipolar planes, which are just 2D geometric structures that separately explore 2D redundancies of light fields. On the other hand, the present invention proposes a prediction model that exploits using intrinsic 4D geometric structure of the light field with 4D hypercones instead.

Patent document US 20180316935 A1, entitled "Method for Encoding and Method for Decoding a Light field Based Image and Corresponding Devices" published on Nov. 1, 2018, by Thomson Licensing, presents a predictive method for encoding purposes where the prediction mode is determined so that spatial unidirectional and spatial bi-directional predictions are interleaved obtaining the residual. On the other hand, the present invention employs hypercones and planes to determine different 4D prediction modes that minimize the Lagrangian cost of encoding the residual. The approach proposed in the present invention is based on 4D geometry and it differs from the patent document US 20180316935 A1, that interleaves spatial unidirectional prediction and spatial bi-directional prediction. The present invention defines the pixels of the 4D causal neighborhood of every 4D block that will be used for 4D intra-light field prediction. In the present invention the 4D prediction should be accomplished by calculating the average of all pixels belonging to the hyperbolic paraboloids or 2D planes originated from the intersection of the hypercones with the 4D causal neighborhoods.

Patent document U.S. Ser. No. 10/531,082 B2, entitled "Predictive Light field Compression" published on Sep. 28, 2017, by Lytro INC. presents a light field compression scheme that partitions the light field into a plurality of blocks, that may be based on their spatial coordinates. This document employs prediction, transform, quantization and entropy coding steps. However, the present invention defines the pixels of the 4D causal neighborhood of every 4D block that will be used for 4D intra-light field prediction. In the 4D block the 4D prediction should be accomplished by calculating the average of all pixels belonging to the hyperbolic paraboloids or 2D planes originated from the intersection of the hypercones (or hyperplanes) with each region from the 4D causal neighborhood. The present invention is based on 4D geometry and differs from patent document U.S. Ser. No. 10/531,082 B2 as it searches for the homologous 3D point projected onto the 4D light field following mathematical expressions derived for different light field generation/acquisition models.

Patent document U.S. Ser. No. 10/687,068 A1, entitled "Method for compressing light field data using variable block-size four-dimensional transforms and bit-plane decomposition", published on Jun. 16, 2020, by Samsung Eletrônica da Amazônia LTDA., relates to compressing light fields using variable block-size four-dimensional transform and bit-plane hexadeca-tree decomposition. Moreover, this document describes a whole light fields codec, with specific transform, quantization strategy, etc. However, the present invention proposes a technique for 4D intra-light field prediction. This technique can be used in combination with U.S. Ser. No. 10/687,068 A1 or other transform-based techniques. Actually, the current widely-used codecs implements a combination of prediction and transform-based techniques. These techniques are complementary and not exclusive.

The paper entitled "Macropixel-constrained Collocated Position Search for Plenoptic Video Coding", published on Dec. 1, 2019, by Lingjun Li and Xin Jin, proposes a motion estimation algorithm for plenoptic video compression, based on the analysis of the relationship between temporal motion and macropixel arrangement. The paper develops its coding scheme based on microlenses arrays, using the fact that plenoptic frames share the same macropixel structure and arrangement. Hence, the paper assumes that the object motion in integer resolution should be reflected by the motion in integer multiples of macropixel size in plenoptic video. The paper tunes the HEVC, which is a 2D coding standard, to use this relationship. However, the present invention differs from the paper as it defines the pixels of the 4D causal neighborhood of every 4D block that will be used for 4D intra-light field prediction, while the paper uses a 2D conventional coding solution.

The paper entitled "Light field Image Coding Using High-Order Intrablock Prediction" published on October, 2017, by R. J. S. Monteiro, P. J. L. Nunes, N. M. M. Rodrigues and S. M. M. Faria, exploits the spatial redundancy in microlenses array (lenslet) light field images by predicting each image block, through a geometric transformation applied to a region of the causal encoded area. The paper uses translations to projective or bilinear transformations, optimized according to an appropriate rate-distortion criterion to guide the search for homologous points within the light field images. Nevertheless, the prediction in the present invention is performed for any type of light field data, not restricting the invention to lenslet light field images. Differently, the invention proposed on this document defines the pixels of the 4D causal neighborhood of every 4D block that will be used for 4D intra-light field prediction. In the present invention the 4D prediction should be accomplished by calculating the average of all pixels belonging to the hyperbolic paraboloids or 2D planes originated from the intersection of the hypercones with the 4D causal neighborhoods.

The paper entitled "Light field HEVC-based image coding using locally linear embedding and self-similarity compensated prediction", published on Jul. 11, 2016, by R. Monteiro et al, uses inherit characteristics of lenslet-based light fields to exploit its redundancy. Due to the repetitive grid of micro-images, the cross-correlation of a light field image is described by several cyclic peaks repeated within a distance of one micro-image, in pixels (vertically and horizontally). This characteristic is used by the self-similarity compensated prediction that is combined with a locally linear embedding based prediction and the HEVC standard to perform the light field coding. This paper differs from the present invention in several points, as the paper does not exploit the innate 4D redundancy of light field data as it just uses 2D coding tools. The paper also uses the characteristics of lenslet-based light fields without employing geometric models of the light field capture system as well as of the 4D structures obtained when imaging the 3D scene in the light field. In this sense, the present invention models the generation/acquisition systems of light field data to fully exploiting its 4D redundancy.

The paper entitled "A Study on the 4D Sparsity of JPEG Pleno Light fields Using the Discrete Cosine Transform", published on October 2018, by G. Alves, et al., presents an exploratory analysis of the 4D sparsity of light fields in the 4D-DCT space. The paper investigates the suitability of 4D-DCT for compressing both lenslets-based and High-Density two-dimensional Camera Array (HDCA) datasets. Results suggest that the lenslets datasets exhibit a high 4D redundancy, with larger inter-SAI than intra-SAI sparsity. For the HDCA datasets, there is also 4D redundancies worthy to be exploited, yet in a smaller degree. Unlike the lenslets case, the intra-SAI redundancy is much larger than the inter-SAI one. The paper was a first investigation concerning the suitability of 4D transforms for light field coding. However, the present invention relates specifically to a 4D prediction technique and not a 4D transform.

The paper entitled "A 4D DCT-Based Lenslet Light field Codec", published on Oct. 7, 2018 by M. B. Carvalho, et al., proposes a preliminary light field codec that fully exploits the 4D redundancy of light field data by using 4D discrete cosine transform (DCT) and encoding of coefficients using bit-planes and hexadeca-tree-guided partitioning. However, the present invention is a 4D prediction technique and not a 4D transform.

SUMMARY

Predictive coding is a fundamental coding technique used in 2D image and video compression. It exploits spatial and temporal correlation within frames and among adjacent frames, respectively. A line-based prediction (LIP) technique is adopted by the H.265/MPEG-H HEVC (H.265/MPEG-H High Efficiency Video Coding) standard and H.264/MPEG-4 Advanced Video Coding (H.264/MPEG-4 AVC) standard as one tool to exploit spatial correlation within frames. Both standards employ a block-based structure for two-dimensional (2D) prediction. In such techniques, pixel values from already encoded neighbors of the current 2D block (with dimensions/size corresponding to integer fractions of the dimensions of the 2D image) are extrapolated to construct a 2D prediction block, where different prediction directions are defined as different prediction modes. The prediction error is then encoded by a 2D separable transform. The angular predictions in H.264/AVC and HEVC assume that a 2D block size is chosen such that its visual content has mostly edges at a given direction. A good model for this is to assume that a tri-dimensional (3D) region in space that is imaged by the block is such that both texture and edges of the 3D region in space can be approximated as a set of straight lines of same orientation in 3D space.

When it comes to the 4D light fields, one could use an extension of the above reasoning, that is, also use the underlying assumption that the 3D region in space imaged by the 4D block in the light field is composed by straight lines of same orientation. The 4D geometrical entity that is the result of the mapping of a straight line in 3D space into a 4D light field is known as a hypercone. Thus, the block extrapolation could be made using hypercones. In addition, by assuming that the 3D region in space being imaged is a plane in 3D space that may not have a texture that can be approximated by a set of edges of same orientation, the prediction could be made by assuming that the plane in 3D space in space is known, and the prediction can be made by extrapolating the corresponding points in the already encoded views.

In this sense, the present invention relates to a method for coding a light field by employing the prediction of a pixel value where all four dimensions of the light field are considered simultaneously when computing said prediction. This is referred to as the four-dimensional (4D) intra prediction of a light field. This 4D intra prediction is performed according to a selected intra prediction mode based on the texture and geometric structure of a 4D block, that are related to the texture and geometric structure of the 3D scene being imaged. In the method, the texture and geometric structure of the pixels in the input 4D block is determined, and the 4D intra prediction is performed according to an intra prediction mode that has the most similar texture and geometric structure to the determined texture of the pixels.

Moreover, the present invention describes a 4D prediction method to be used as a step in the coding of light fields that generates a 4D residual that can be encoded more efficiently by, for example, a transform based 4D codec. The present invention comprises:

Light field acquisition/generation models;
Line and plane parameterization (Hypercone, 4D Blocks, Causal Regions);
4D Prediction Modes.

BRIEF DESCRIPTION OF THE DRAWINGS

The objectives and advantages of the present invention will be made clearer through the following detailed description of the example and non-limiting drawings presented at the end of this document.

DETAILED DESCRIPTION

Figure 1:
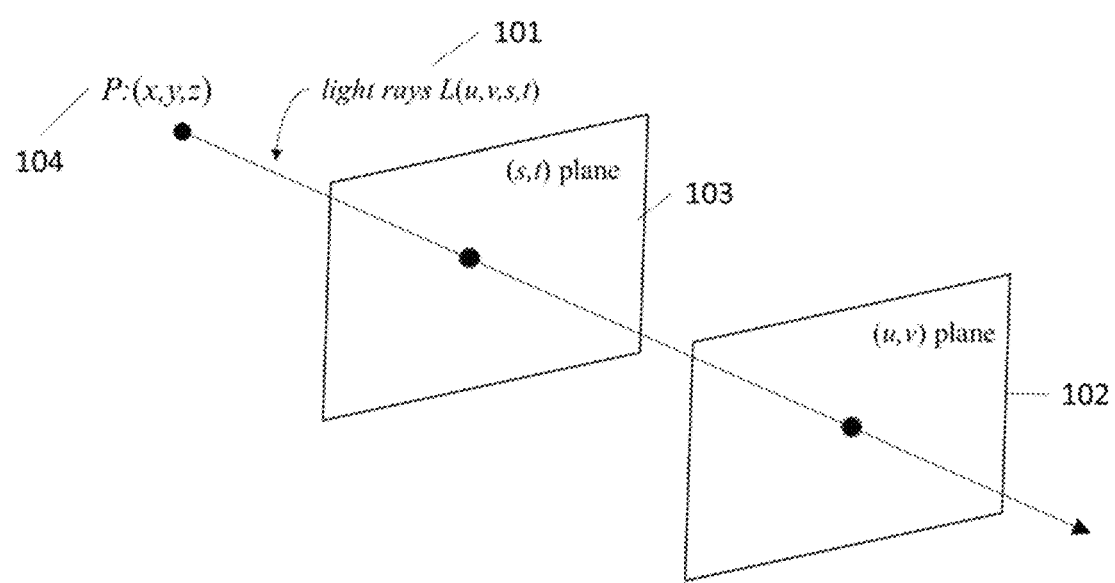
FIG. 1 describes a two-plane parametrization of a light ray according to an embodiment of the present invention.

FIG. 1 shows a two-planes parametrization of the light rays, L (u,v,s,t) (101), which is a 4D simplification of the plenoptic function that considers the intensity of each light ray constant along its path, parameterizing each light ray by the two two-dimensional (2D) coordinates of its intersection with two parallel planes (u×v (102) and s×t (103)). Except for light rays that are parallel to the u×v plane, all light rays can be uniquely represented as a 4-tuple (u,v,s,t), where the light rays parameterized under the two-planes parameterization form a 4D vector space. For all rays originating at point P (104) in the 3D space, u varies linearly with s, and by extension v with t.

Figure 2:
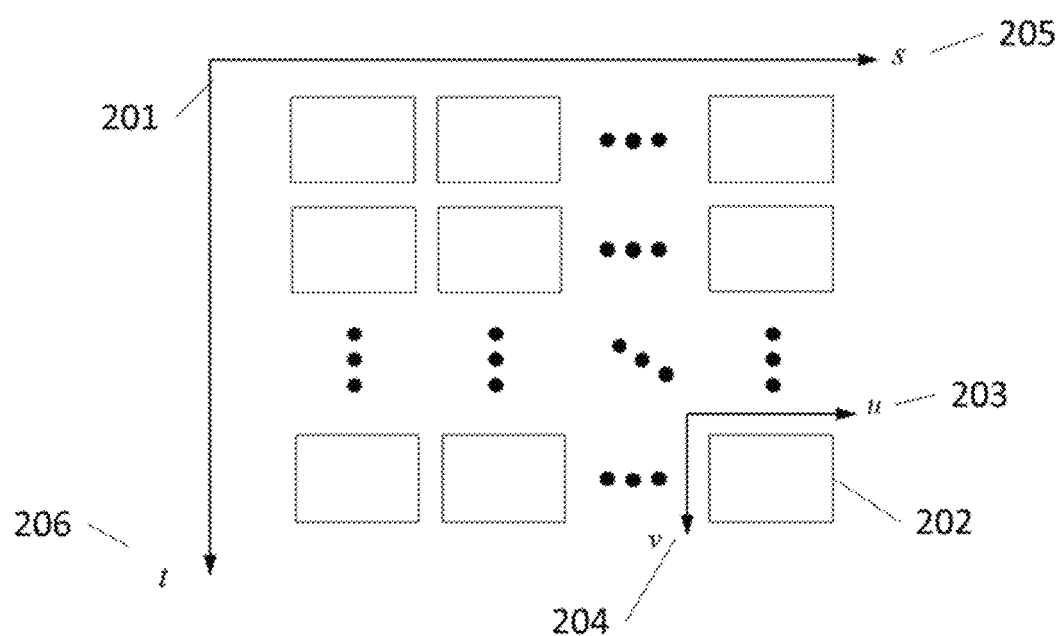
FIG. 2 depicts a 4D light field represented as a matrix of views according to an embodiment of the present invention.

Light field datasets are usually composed of a set of color components, each comprising a 4D light fields of dimensions (u,v,s,t). The views are addressed by the (s,t) coordinates pair (201), as shown in FIG. 2, and may be referred as the view or angular coordinates, while the (u,v) pair (202) addresses a pixel within each (s,t) view and may be referred as the spatial coordinates. Such a light field can be interpreted as a collection of perspective images taken from an observer position defined in the s×t view plane (203), each one defined on the u×v image plane (102), as shown in FIG. 1.

Therefore, a light field, that is a 4D signal, has both spatial (intra-view, within the u×v image plane (102)) and inter-view (within the s×t view plane (103)) redundancies. If one is able to exploit both spatial and view redundancies, or, in other words, the whole 4D correlation, then the 4D signal that is a light field can be efficiently compressed. This efficient compression is required for real-life applications since light field media is large enough to correspond to a huge amount of data. This large amount requires efficient compression schemes, such as the scheme presented in this invention.

Figure 3:
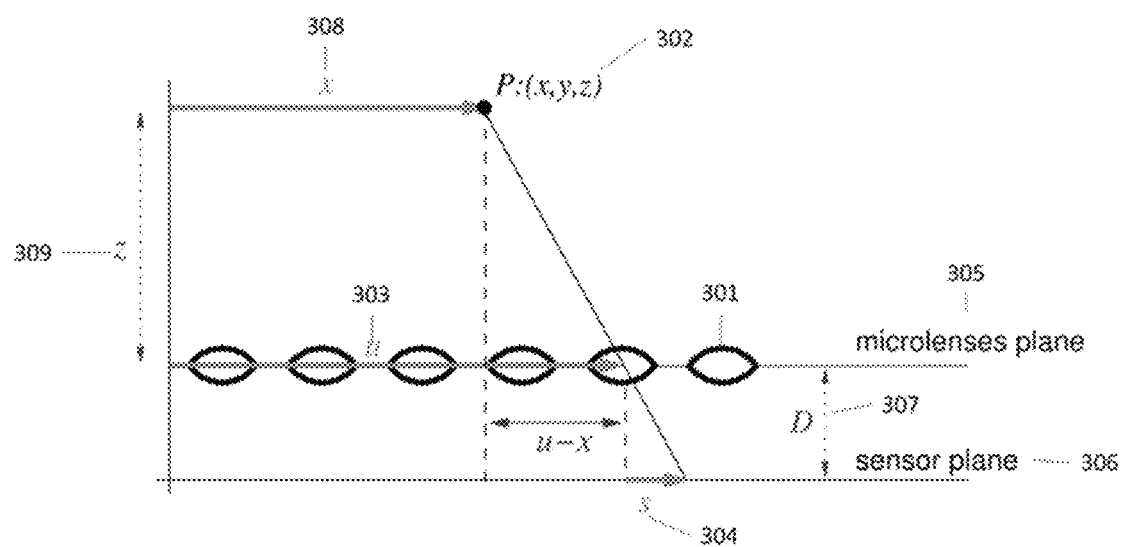
FIG. 3 depicts the Model-1: Lenslet model (microlenses camera array) light field capture device according to an embodiment of the present invention.

The acquisition/generation model of a light field can be performed by an actual device or can be a geometric model for synthetic light fields. Two different acquisition/generation models parameterize the line. The first model is the lenslet model as illustrated in FIG. 3, hereinafter referred to as Model-1. The second model is the camera array model, illustrated in FIG. 4, hereinafter referred to as Model-2.

In Model-1 different pixels in a view are imaged by different microlenses (301). The corresponding pixels among different views are imaged by the same microlens (301). From FIG. 3 (Model-1), Equation 1 shows how the 3D point P (302), at distance z (309) from the sensor plane (306), is mapped as a function of u (303) and s (304) by triangle similarity, where u (303) varies linearly with s (304) for P (302) fixed. The microlenses array is on a plane parallel (305) to the sensor plane (306). The distance between the microlenses plane (305) and the sensor plane (306) is D (307). The mapping of P (302) as a function of v (204) and t (206) is obtained by substituting the variable x (308) by variable y, variable s (304) by variable t (206) and variable u (303) by variable v (204) (Equation 2).

$$\frac{z}{u-x} = \frac{D}{s} \qquad \text{[Equation 1]}$$

$$\frac{z}{v-y} = \frac{D}{t} \qquad \text{[Equation 2]}$$

Figure 4:
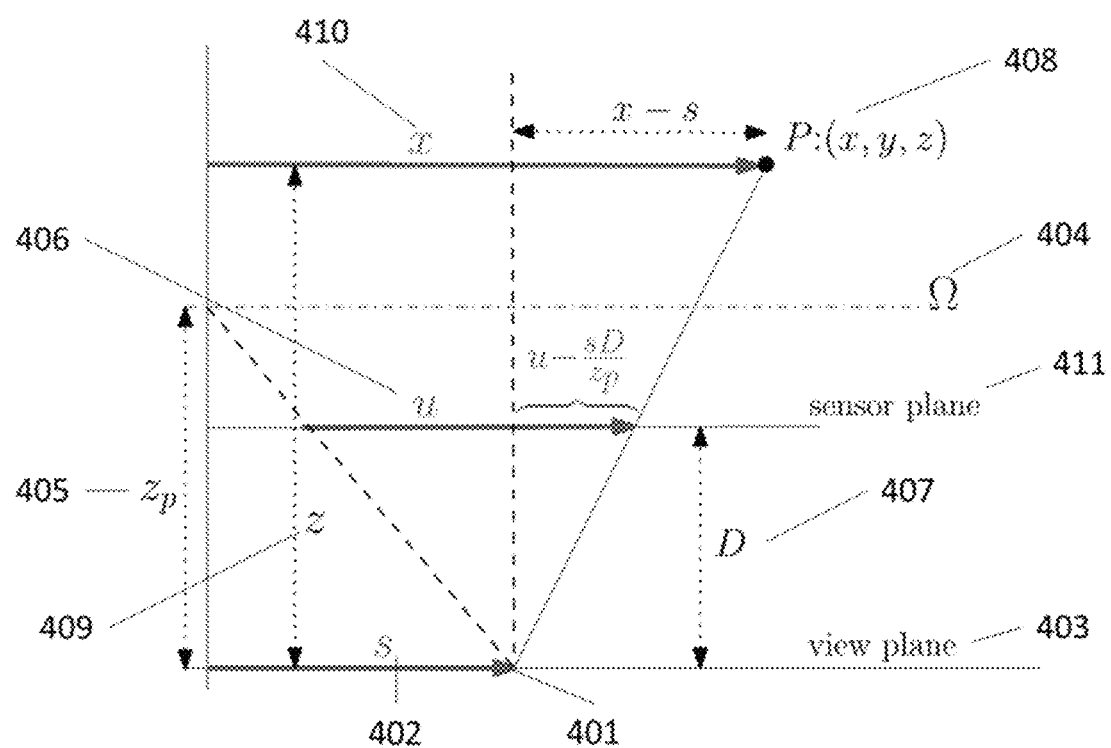
FIG. 4 depicts the Model-2: Camera array model light field capture device according to an embodiment of the present invention.

In Model-2, depicted in FIG. 4, the acquisition/generation is made by cameras (or models of cameras) with optical centers (401) with coordinates s (402) that belong to a view plane (403). In this model, all points of the scene belonging to plane Ω (404), that is parallel to the view plane (403), at distance $z_p$ (405) from the view plane (403) are mapped at a coordinate u (406), in the sensor plane (411) that is parallel to the view plane (403) at distance D (407) from the view plane (403) with u (406) being independent of the viewpoint position s (402). Equation 3 shows how the 3D point P (408), at distance z (409) from the view plane (403), is mapped as a function of u (406) and s (205, 402) by triangle similarity, where u (406) varies linearly with s (402) for P (408) fixed. The mapping of P (408) as a function of v (204) and t (206) is obtained by substituting the variable x (410) by variable y, variable s (402) by variable t (206) and variable u (406) by variable v (204) (Equation 4).

$$\frac{x-s}{z} = \frac{u}{D} - \frac{s}{z_p} \qquad \text{[Equation 3]}$$

$$\frac{y-t}{z} = \frac{v}{D} - \frac{t}{z_p} \qquad \text{[Equation 4]}$$

The intra predictions in the 2D video coding standards H.264/AVC and HEVC are performed in a 2D block-based manner, by referring to the neighboring pixels of previously decoded blocks which are left to and/or above the block to be predicted. In fact, they assume that the block to be predicted contains only features that can be modeled as straight lines. In other words, the supposition is that the block is the image of a region in 3D space containing features that can be approximated by only edges/lines at a given orientation. Since the image of an edge/line in 3D space is a line in the 2D image, if this assumption holds the directional intra prediction, that uses lines of same direction to predict all the pixels in a block, will be effective.

Using the above reasoning, in this invention the directional intra prediction is extended to the 4D light field by computing what is the 4D image of an edge/line in 3D space that is captured/generated by the light field. This image will be the main element to be used to perform 4D intra prediction in the light field, in the same way that the straight line is the main element used in the HEVC or H.264 intra prediction. In the present invention the 4D prediction should be accomplished by calculating the average of all pixels belonging to the hyperbolic paraboloids originated from the intersection of the hypercones (or hyperplanes) with each region from the 4D causal neighborhoods.

Figure 5:
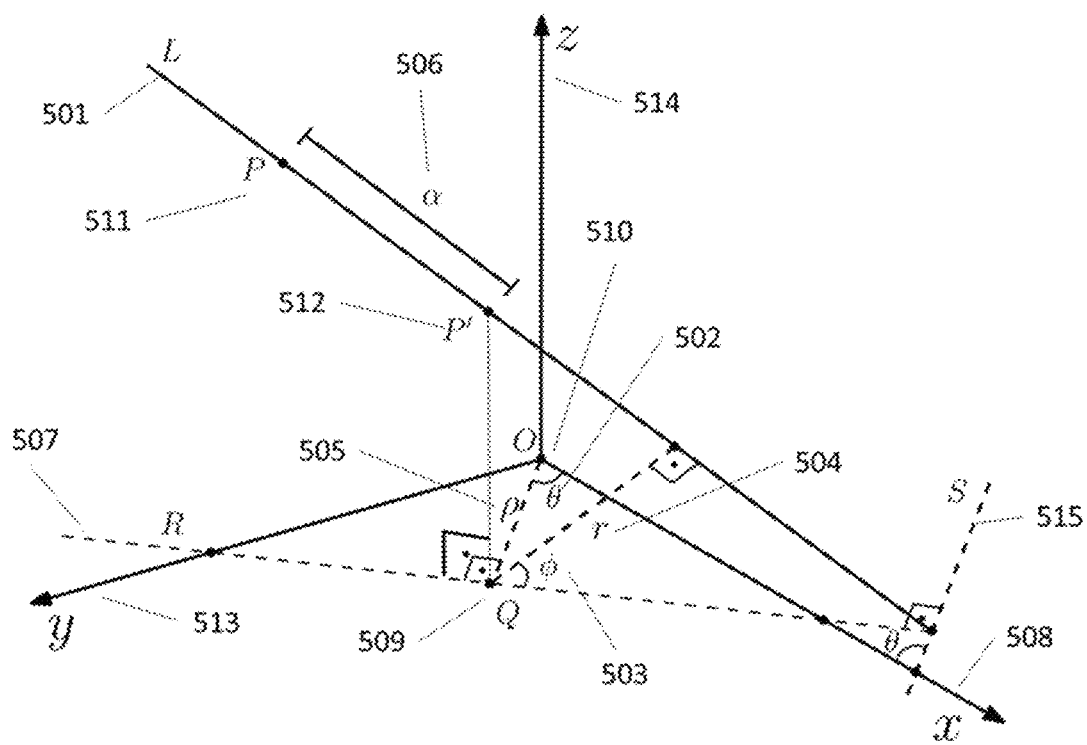
FIG. 5 presents line and plane parametrization according to an embodiment of the present invention.

As shown in FIG. 5, a line L (501) can be parameterized in a 3D space by $\theta$ (502), $\phi$ (503), r (504), $\rho$ (505) and $\alpha$ (506) as in Equation 5. The projection of the plane containing L (501) that is orthogonal to the xy plane is given by the line R (507). The normal from the origin O (510) to this plane containing L (501) intercepts R (507) at a point Q (509) and makes an angle $\theta$ (502) with the x axis (508), and R (507) that has a distance $\rho$ (505) to O (510). The angle of the normal to L (501) from point Q (509) makes an angle $\phi$ (503) with line R (507) and has distance r (504) to line R (507). The coordinates (x,y,z) of point P (511) on line L (501) at a distance a (506) from P' (512) are given in Equation 5.

$$\begin{bmatrix} x \\ y \\ z \end{bmatrix} = \begin{bmatrix} -\sin\theta\sin\phi \\ \cos\theta\sin\phi \\ \cos\phi \end{bmatrix} \alpha + \begin{bmatrix} \rho\cos\theta \\ \rho\sin\theta \\ \frac{r}{\sin\phi} \end{bmatrix} \qquad \text{[Equation 5]}$$

Considering the two-plane parameterization of light rays, the image in the 4D light field of any 3D scene point is mapped to a 2D ray hyperplane W. Also, the image in the 4D light field (u,v,s,t) of any 3D line can be parameterized by the 4-tuple $(u_0, v_0, s_0, t_0)$, as an hypercone H, represented by Equation 6.

$$(u-u_0)(t-t_0) = (v-v_0)(s-s_0) \qquad \text{[Equation 6]}$$

where u (203), v (204), s (205) and t (206) are the 4D coordinates of a light field, and $u_0 t_0 = v_0 s_0$.

Equations 7 and 8 give the mathematical expressions of the 4-tuple $(u_0, v_0, s_0, t_0)$ of the hypercones corresponding to acquisition/generation Model-1 and Model-2, according to FIG. 5.

For Model-1 (lenslet), $u_0$, $v_0$, $s_0$ and $t_0$ are defined in the mathematical expressions listed as Equation 7.

$$u_0 = \left(\rho\cos\theta + r\frac{\sin\theta}{\cos\phi}\right) \qquad \text{[Equation 7]}$$

$$v_0 = \left(\rho\sin\theta + r\frac{\cos\theta}{\cos\phi}\right)$$

$$s_0 = -D(-\sin\theta\tan\phi)$$

$$t_0 = -D(\cos\theta\tan\phi)$$

For Model-2 (camera array), $u_0$, $v_0$, $s_0$ and $t_0$ are defined in the mathematical expressions listed as Equation 8.

$$u_0 = D\left(-\sin\theta\tan\phi + \frac{\rho}{z_p}\cos\theta + \frac{r}{z_p}\frac{\sin\theta}{\cos\phi}\right) \qquad \text{[Equation 8]}$$

$$v_0 = D\left(\cos\theta\tan\phi + \frac{\rho}{z_p}\sin\theta + \frac{r}{z_p}\frac{\cos\theta}{\cos\phi}\right)$$

$$s_0 = \rho\cos\theta + r\frac{\sin\theta}{\cos\phi}$$

$$t_0 = \rho\sin\theta + r\frac{\cos\theta}{\cos\phi}$$

The image of a 3D point in Model-1 is a hyperplane defined by Equations 1 and 2. The image of a 3D point in Model-2 is a hyperplane defined by Equations 3 and 4, in both modes the image of a 3D point is a 2D hyperplane W.

The k-th 4D block $B_k$ is a subset of a 4D light field in which:

$$U_L^k \leq u \leq U_H^k; V_L^k \leq v \leq V_H^k; S_L^k \leq s \leq S_H^k; T_L^k \leq t \leq T_H^k \qquad \text{[Equation 9]}$$

that is scanned in the k-th order and such that $B_i \cap B_j = \emptyset$, and $U_k B_k$ is equal to the whole light field. $U_L^k$ and $U_H^k$ correspond, respectively, to the lower and upper limits of the u dimension, $V_L^k$ and $V_H^k$ correspond, respectively, to the lower and upper limits of the v dimension, $S_L^k$ and $S_H^k$ correspond, respectively, to the lower and upper limits of the s dimension, and $T_L^k$ and $T_H^k$ correspond, respectively, to the lower and upper limits of the t dimension.

The causal region of Type i of the k-th 4D block, $\mathcal{R}_k^i$, with i={I, II, III, IV, V}, is defined as in Table 1:

TABLE 1

| Region | Description |
|---|---|
| $\mathcal{R}_k^I$ | 4D region composed by the union of 4D blocks 1 to k − 1, $\cup_{j=1}^{k-1} B_j$ |
| $\mathcal{R}_k^{II}$ | Intersection of $\mathcal{R}_k^I$ with the hyperplane corresponding to u (203) fixed |
| $\mathcal{R}_k^{III}$ | Intersection of $\mathcal{R}_k^I$ with the hyperplane corresponding to v (204) fixed |
| $\mathcal{R}_k^{IV}$ | Intersection of $\mathcal{R}_k^I$ with the hyperplane corresponding to s (205) fixed |
| $\mathcal{R}_k^V$ | Intersection of $\mathcal{R}_k^I$ with the hyperplane corresponding to t (206) fixed |

In this invention the color channels are independently predicted. Therefore, a sample from the color channel being predicted is defined as I(u,v,s,t), ignoring the specification of the color channel.

As described herein, the invention consists of three prediction modes that together fully exploit the 4D redundancy of a light field that provide a prediction $P_k$ of a block $B_k$ that generates a prediction residual $P_k - B_k$ that is amenable to efficient encoding, thus generating a representation of the light field with a reduced amount of data. The three prediction modes of this invention are named 2D plane mode, hypercone mode and DC mode. Within a codec loop, in which the prediction residual is encoded, one may choose the prediction mode that minimizes the Lagrangian cost of encoding the residual and signaling the corresponding prediction mode The 2D plane prediction mode exploits the mapping of a point in 3D space into the 4D light field as given by Equations 1 and 2 for acquisition/generation Model-1 and Equations 3 and 4 for acquisition/generation Model-2. The key assumption underlining this prediction mode is that points in 3D space imaged by 4D block $B_k$ belong to the same plane n in 3D space. Its main use is in the cases where plane n contains no directional texture.

Figure 6:
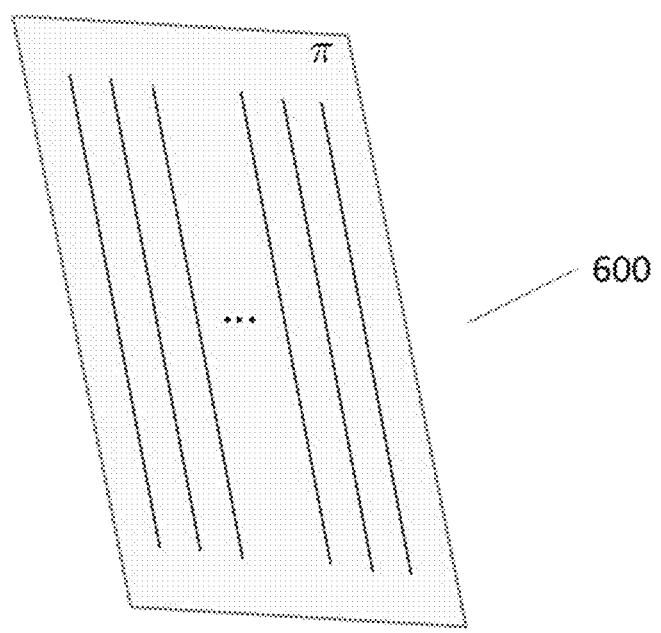
FIG. 6 shows a directional texture in a plane according to an embodiment of the present invention.

In this invention, plane n is parameterized having as reference the equation of a 3D line in space (501) as given by Equation 5. A plane n in 3D space containing line L (501) is given by Equation 10. Line L (501) has direction defined by θ (502) and ϕ (503). Angle ψ (Equation 10) is the angle of plane π with the plane defined by lines L (501) and S (515). Plane π has distance d to the origin O (510) of the coordinate system. Since the 2D plane prediction mode does not assume that plane n has a directional texture (600), as shown in FIG. 6, θ (502) is considered equal to zero, without loss of generality. Therefore, the 2D plane prediction mode is specified by the plane parameters ϕ (503), ψ, and d according to Equation 11.

$$(\sin\psi\cos\theta - \cos\psi\sin\theta\cos\phi)x + (\sin\psi\sin\theta + \cos\psi\cos\theta\cos\phi)y + (-\cos\psi\sin\phi)z = d \quad \text{[Equation 10]}$$

$$(\sin\psi)x + (\cos\psi\cos\phi)y - (\cos\psi\sin\phi)z = d \quad \text{[Equation 11]}$$

The prediction value P(u,v,s,t) of sample (u,v,s,t) in $B_k$ is computed by projecting its corresponding ray from the light field to plane π, and then projecting it back to each view that has pixels in the causal region $R_k^I$. The calculation of the intensity value of this projection is performed by computing, for each view $(\tilde{s}, \tilde{t})$, that has pixels of coordinates $(\tilde{u}, \tilde{v}, \tilde{s}, \tilde{t})$ belonging to causal region $R_k^I$, the coordinates $(\hat{u}, \hat{v})$ of the pixel in view $(\tilde{s}, \tilde{t})$. The coordinates $(\hat{u}, \hat{v})$ are a function of (u,v,s,t), $(\tilde{s}, \tilde{t})$, ϕ, ψ, and d, and are computed by solving Equations 1, 2, 11, 12, and 13, considering the particular case of acquisition/generation Model-1 and Equations 3, 4, 11, 14, and 15, considering the particular case of acquisition/generation Model-2.

$$\frac{z}{\hat{u}-x} = \frac{D}{\tilde{s}} \quad \text{[Equation 12]}$$

$$\frac{z}{\hat{v}-y} = \frac{D}{\tilde{t}} \quad \text{[Equation 13]}$$

$$\frac{x-\tilde{s}}{z} = \frac{\hat{u}}{D} - \frac{\tilde{s}}{z_p} \quad \text{[Equation 14]}$$

$$\frac{y-\tilde{t}}{z} = \frac{\hat{v}}{D} - \frac{\tilde{t}}{z_p} \quad \text{[Equation 15]}$$

The prediction value P(u,v,s,t) will be the average of the intensities $I(\hat{u}, \hat{v}, \tilde{s}, \tilde{t})$ of these projections across all coordinates $(\hat{u}, \hat{v}, \tilde{s}, \tilde{t})$ that are in the causal region $R_k^I$ of $B_k$.

The best parameters for the 2D plane mode can be searched by varying angles θ in the [−π, π] interval and ψ in the [−π/2, π/2] interval. Given ϕ and ψ, the variation range of d can be computed using exhaustive search, or, from the knowledge of the minimum and maximum disparities in the light field. The resolutions of these variations depend on the specific codec used to encode the residuals, and may also depend, for example, on 4D block size and acquisition/generation parameters. The optimal choice may be made, for example, by using a rate-distortion criterion after encoding the residuals using, for example, a 4D codec such as the 4D transform mode as presented in the article entitled "ISO/IEC JTC 1/SC29/WG1N84065: Information technology—JPEG Pleno Plenoptic image coding system—part 2: Light field coding", published in 2019. Alternatively, the prediction parameters can be directly computed by determining the plane n using depth estimation methods.

In this invention, the hypercone mode assumes that the region in 3D space being imaged is composed by a plane containing a directional texture (600). The prediction parameters are the ones specifying the plane π in 3D space and the direction of the texture on it, that is, θ (502), and ϕ (503), that specify the direction of the texture on the plane (Equation 5), ψ and d, that complete the specification of the plane given the texture direction. Its expression is given by Equation 10. The directional texture (600) in the plane π in 3D space is exemplified in FIG. 6.

Each line comprising the directional texture on the plane π (600) is imaged by the hypercone (H) given by Equation 6. For acquisition/generation Model-1, the hypercone parameters are given by Equation 7 and for acquisition/generation Model-2, by Equation 8.

Given θ (802) and ϕ(803), each line in 3D space is defined by two more parameters, ρ (504) and r (505), for both acquisition/generation models (Model-1 and Model-2). From the hypercone equations for acquisition/generation Model-1, Equations 6 and 7, one can see that all lines in plane π that share the same parameters θ (502) and ϕ(503), originate hypercones in which $s_0$ and $t_0$ depend only on θ (502) and ϕ(503). Therefore, their interception with a view (s,t) are parallel straight lines with angular coefficient in the space u×v is given by Equation 16.

$$\eta = (s-s_0)/(t-t_0) \quad \text{[Equation 16]}$$

Likewise, from the hypercone equations for acquisition/generation Model-2, Equations 6 and 8, all lines in π that share the same parameters θ (502) and ϕ(503), originate hypercones whose interception with a view (s,t) create straight lines in the plane u×v that pass through the point $(\underline{u}^\circ, v^\circ)$ given by the mathematical expressions listed as Equation 17.

$$u^O = D\left(-\sin\theta\tan\phi + \frac{s}{z_p}\right) \quad \text{[Equation 17]}$$

$$v^O = D\left(\cos\theta\tan\phi + \frac{t}{z_p}\right)$$

The prediction is performed by having as a reference an anchor view $(s^A, t^A)$. The main underlying assumption of the hypercone prediction mode is that that the light field is partitioned such that the 4D block $B_k$ corresponds to a region in 3D space that is modeled by a plane in 3D space containing a directional texture (600). Therefore, it is composed by lines of same orientation in 3D space, and the image projected on the 4D light field by each of these lines $L_i$ belonging to plane n is an hypercone $H_i$. The interception of $H_i$ with the anchor view $(s^A, t^A)$ is a straight line $l_i^A$ in the u×v plane. As pointed out above, in acquisition/generation Model-1 the $l_i^A$ have the same angular coefficient for all i and, for acquisition/generation Model-2, the $l_i^A$ passes through the same point $(\underline{u}^\circ, v^\circ$ for all i. Therefore, a point $(u_i, v_i)$ (different from $(\underline{u}^\circ, v^\circ$ for acquisition/generation Model-2) in view $(s^A, t^A)$ uniquely specifies $l_i^A$, and therefore, the hypercone $H_i$. Having $H_i$, one can perform the prediction of the region of $B_k$ corresponding to the 3D line Li in the 4D block $B_k$. The prediction value is given by the average of the light field intensities along the intersection of $H_i$ with the union of the causal regions $R_k^{II}$, $R_k^{III}$, $R_k^{IV}$, and $R_k^V$, as described in Table 1. The intensity values of this intersection can be estimated using subpixel interpolation. If the point $(u_i, v_i)$ moves along the boundaries of the intersection of $\mathcal{B}_k$ with the anchor view $(s^A, t^A)$, the corresponding hypercone $H_i$ can scan the whole 4D block $\mathcal{B}_k$, performing the 4D block's prediction. Note that this is true for both acquisition/generation Model-1 and Model-2, since a straight line is defined either by its point $(u_i, v_i)$ and its angular coefficient η (Equation 16—acquisition/generation Model-1) or by its point $(u_i, v_i)$ and the other point $(\underline{u}°, v°)$ (Equation 17—acquisition/generation Model-2).

In this invention the best parameters for the hypercone mode can be searched by varying angles (502) in the [−π/2, π/2] interval, φ (503) in the [−π, π] interval, and ψ (Equation 10) in the [−π/2, π/2] interval. Given θ, φ and d can be varied as described in the sequel. If the angles θ, φ and ψ are given and d is not, a straight line $l_i^A$, in the u×v plane of view $(s^A, t^A)$ does not uniquely specify the hypercone $H_i$, since it requires the knowledge of two further parameters from the line in 3D space $L_i$, ρ and r. Since without d there is no equation of plane π, one is left with just the equation defining the line $l_i^A$. The other equation may be the equation of the line $l^{AU}$, that is the intersection of the hypercone $H_i$ with an auxiliary view $(s^{AU}, t^{AU})$. These would suffice to specify $H_i$, and therefore one would have the one more equation sufficient for the estimation of parameter d of plane π. Line $l^{AU}$, likewise line $l_i^A$, has an angular coefficient given by Equation 16, that is, $n^{AU}=(s^{AU}-s_0)/(t^{AU}-t_0)$ for acquisition/generation Model-1, and for acquisition/generation Model-2 it passes through a point $(u^{o'}, v^{o'})$. Therefore, it can be uniquely specified by a point $(u'_i, v'^i)$ (different from $(u^{o'}, v^{o'})$ for acquisition/generation Model-2) in the view $(s^{AU}, t^{AU})$. Thus, instead of searching for the parameter d, one could move the point $(u'_i, v'_i)$ along the boundaries of the intersection of $\mathcal{B}_k$ with the view $(s^{AU}, t^{AU})$, and choose the set of θ, φ, ψ and $(u'_i, v'_i)$ that give the best prediction mode. Since the point $(u'_i, v'_i)$ moves along the boundaries of the intersection of $\mathcal{B}_k$ with the view $(s^{AU}, t^{AU})$, only one parameter may be searched to determine the pair $(u'_i, v'_i)$ (e.g., the distance along the boundary). As in the case of the 2D plane prediction mode, the accuracy of these searches depends on the specific codec used to encode the residuals, and may also depend, for example, on 4D block size and acquisition parameters. The optimal choice may be made, for example, using a rate-distortion criterion after encoding the residuals using, for example, a 4D codec such as the 4D transform mode in "ISO/IEC JTC 1/SC29/WG1N84065: Information technology—JPEG Pleno Plenoptic image coding system—part 2: Light field coding". Alternatively, the prediction parameters φ, ψ, and d can be directly computed by determining the plane π using depth estimation methods, with the need only to search for the texture orientation θ.

In this invention, for the DC mode the 4D block $\mathcal{B}_k$ is predicted by the average of the light field samples in the union of the causal regions $\mathcal{R}_k^{II}$, $\mathcal{R}_k^{III}$, $\mathcal{R}_k^{IV}$, and $\mathcal{R}_k^V$. The DC mode, that does not rely on any assumptions about the causal region, is likely to be used when the assumption that the points in 3D space being imaged by the 4D block $\mathcal{B}_k$ approximately lie on a plane does not hold.

Figure 7:
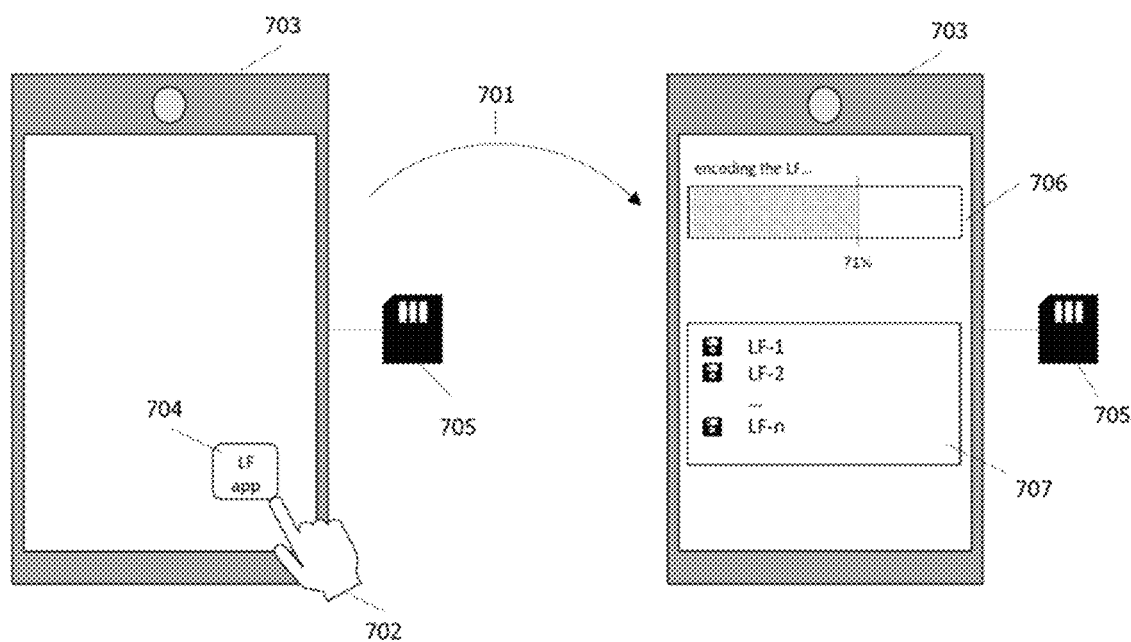
FIG. 7 depicts an embodiment of the present invention on a smartphone according to an embodiment of the present invention.

FIG. 7 depicts an embodiment of the present invention, where the solid arrow (701) represents the sequence of events. The action starts with a user (702) using a smartphone (703), where a system implementing the proposed invention was previously deployed in the form of a light field application (704). The application encodes the light field captured by the smartphone camera, which can be stored in a memory (705), which should be understood as a memory card, the smartphone internal memory, in the cloud, or in another device. The progress of the light field encoding process can be checked by the means of a progress bar (706). The light field is saved in the designated storage area (705), being accessed as a list (707) or in other way (e.g., icons). The encoding process can be performed locally, with no need of additional processing steps in external or remote machines, despite eventual memory and processing restrictions of the smartphone.

Figure 8:
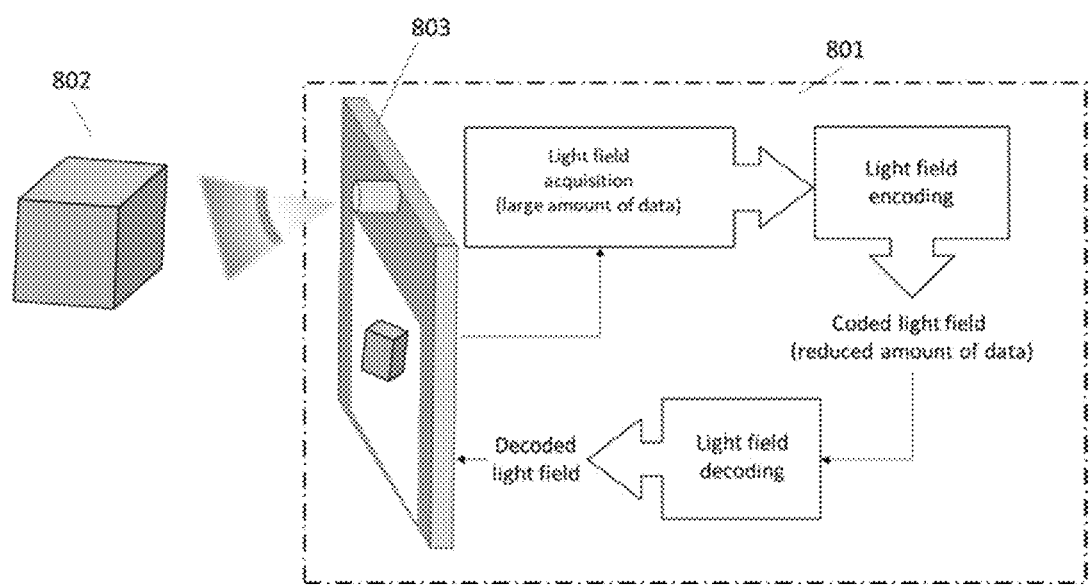
FIG. 8 presents an overview operation of the method of the present invention in the smartphone according to an embodiment of the present invention.

FIG. 8 illustrates the overview operation of the method of the present invention in the smartphone, but not limited to this type of device. Each rectangular box is an activity, and the arrows represent the precedence of activities (801). The 3D object (802), or the 3D scene, is captured by the smartphone's (803) camera and can be encoded and decoded to be exhibited in the smartphone's display or in other display, any of those capable of displaying light field data.

Figure 9:
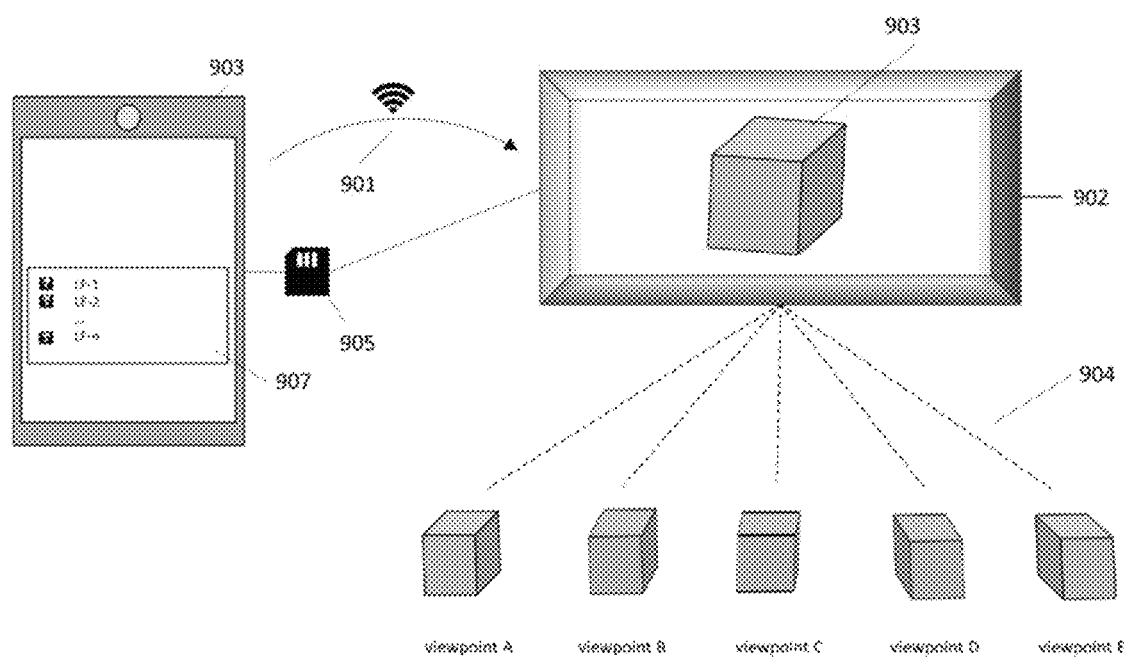
FIG. 9 shows the encoded light field data being sent to a light field display using a wireless connection according to an embodiment of the present invention.

FIG. 9 shows another embodiment of the invention, where the encoded light field data (907) can be sent to a light field display (902) using a wireless connection (901), or by transferring the encoded light field data by inserting the memory card in an appropriate slot of the light field display (902). Then, the light field display (902) can decode the encoded light field data (907) and exhibit it (903). The decoded light field data could be observed from its different viewpoints (904), that may be limited by the light field acquisition/generation system and the light field display capabilities.

According to various embodiments, the system and method of the present invention process light field image data to represent the original data with a reduced number of symbols/bits.

The human visual system (HVS) is capable of perceiving a three-dimensional (3D) world due to its faculty of depth understanding. Television sets displaying two-dimensional (2D) images do not confer the realism that a 3D rendering could certainly provide. Therefore, depth perception offered by systems which employ at least two views of a scene could bring the real world to many applications. While stereo (2D) and multiview camera systems fail to produce sufficiently accurate and reliable 3D reconstructions, images captured (or generated) by light field devices are alternative high-performance imaging systems. These light fields can be sampled by recording (or creating) conventional images of the object from a huge number of viewpoints, generating a huge amount of data. Therefore, an efficient compression scheme is essential to reduce this large amount of data yet maintaining the perceptual visual quality at the decoder side to allow efficient rendering of scenes. Any encoding scheme tries to achieve the desired trade-off between minimizing the bitrate and maximizing the quality.

The light field datasets Greek and Sideboard are 4D structures of dimensions (9×9×512×512), presenting different scene geometries. They have each 9×9 views (a 2D array of 9×9 images), where each view (image) presents spatial dimensions of 512×512 pixels. The different scene geometries provide objects at different depth levels, i.e. objects that are closer or farther from the observer (viewer, camera). In addition, each scene has objects that exhibit specularities, repetitive patterns, fine details, contrast variations that are challenging features to any compression scheme.

The Tarot dataset is a 4D structure of dimensions (17×17×1024×1024), presenting an indoor scene with complex specularities, objects with different degrees of texture at different depths. The dataset has 17×17 views (a 2D array of 17×17 images), where each view (image) presents spatial dimensions of 1024×1024 pixels. The complex scenario stresses any light field coding scheme.

One way to measure the performance a compression method is by using a metric that evaluates the compression ratio in relation to the quality of the compressed/decompressed data. The Peak Signal-to-Noise Ratio (PSNR) vs bitrate is the most employed metric in image/video/light field coding. The higher the value of the PSNR the better is the quality of the decompressed data, while a lower bitrate denotes the compression capability of a compression method.

As an example of a practical codec using this invention, there is the JPEG Pleno Light field codec in the 4D-Transform mode in which instead of transforming a 4D block resulting from the variable block-size partitioning, one first computes its prediction residual prior to transforming, computing the Lagrangian cost associated to each parameter configuration of each prediction mode choosing the one with the smallest Lagrangian cost. In this example, only the DC mode and the 2D plane mode using fixed values for parameters $\phi$ (503) and $\psi$ (Equation 10) were used, with $\phi=\pi/2$ and $\psi=0$, and searched for 29 values of d uniformly distributed within the depth range of the light field that provides the smallest Lagrangian cost. In this example, the hypercone mode was not enabled. The 4D block size used was 9×9×64×64.

Figure 10:
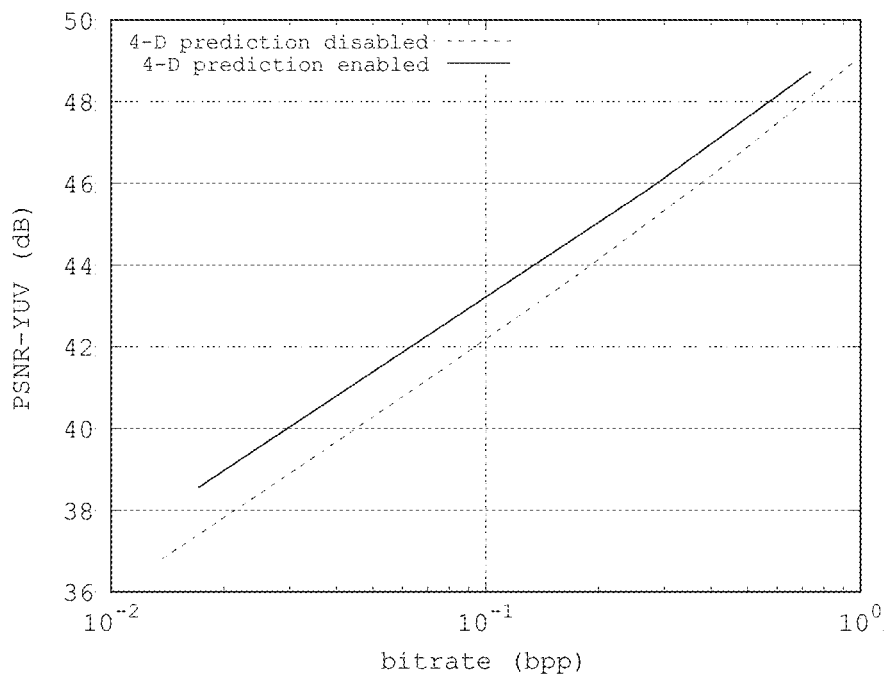
FIGS. 10 to 12 present the PSNR-YUV vs bitrate curves for the practical codec with the 4D prediction being enabled and disabled for the Greek, Sideboard and Tarot datasets according to an embodiment of the present invention.
Figure 11:
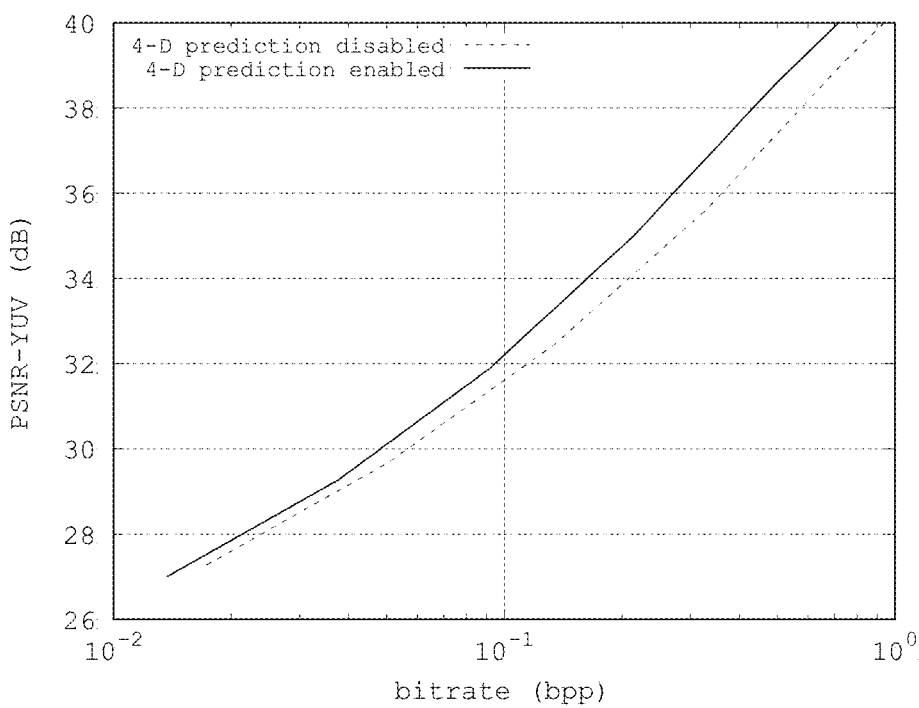
Figure 12:
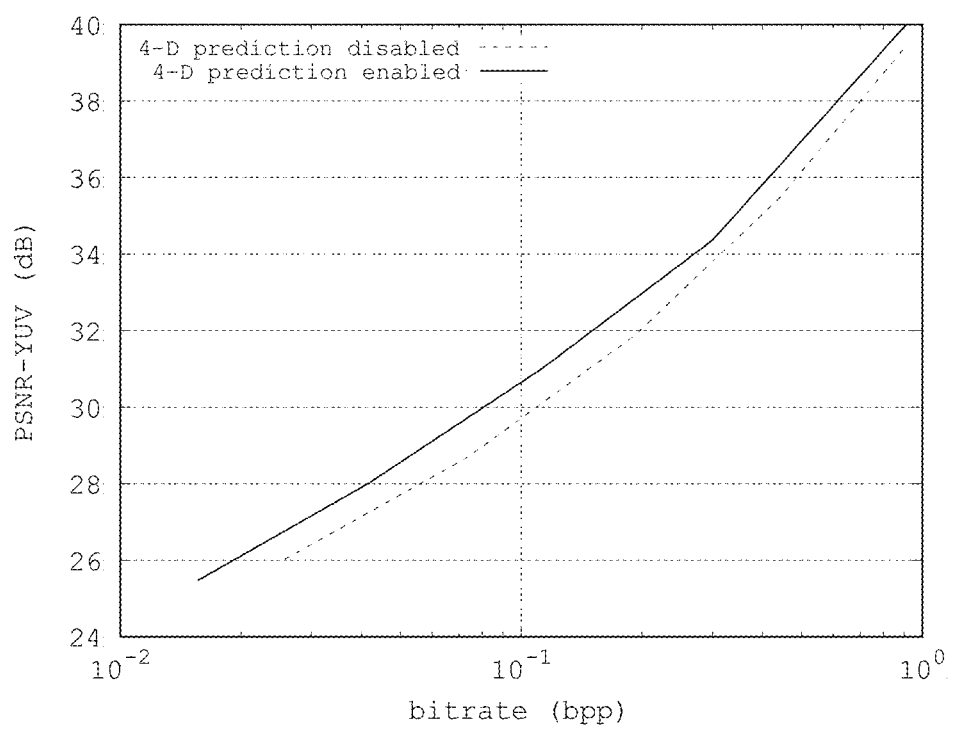

The PSNR-YUV (PSNR averaged among the color components) vs bitrate curves for the above practical codec with the 4D prediction enabled and disabled is exhibited in FIG. 10 for Greek dataset, FIG. 11 for Sideboard dataset and in FIG. 12 for Tarot dataset. The Tarot dataset was subsampled to 9×9×512×512. Gains are achieved for all datasets when enabling the 4D prediction. This provides clear evidence of the effectiveness of the proposed invention. The practical codec above with the 4D prediction disabled is equivalent to the JPEG Pleno 4D-Transform mode light field codec, "ISO/IEC JTC 1/SC29/WG1N84065: Information technology—JPEG Pleno Plenoptic image coding system—part 2: Light field coding". It is important to point out that these results mean that the 4D prediction scheme has provided significant gains to a recent light field coding scheme in its final stage of standardization.

Although the present invention has been described in connection with certain preferred embodiments, it should be understood that it is not intended to limit disclosure to those particular embodiments. Instead, it is intended to cover all possible alternatives, modifications and equivalents within the spirit and scope of the invention, as defined by the appended claims.

What is claimed is:

1. A method of four-dimensional intra-prediction coding and decoding of light field data, the method comprising:
receiving light field acquisition/generation models;
parametrizing line and plane according to light field data of the received light field acquisition/generation models; and
using four-dimensional (4D) Prediction Modes to provide a prediction Pk of a k-th 4D block $B_k$ that generates a prediction residual Pk−Bk, including: a two-dimensional (2D) plane mode, a hypercone mode and a DC mode,
wherein the method further comprises:
parameterizing an image in 4D light field (u,v,s,t) of any three-dimensional (3D) line by a 4-tuple $(u_0, v_0, s_0, t_0)$, as an hypercone H as follows:

$(u-u_0)(t-t_0)=(v-v_0)(s-s_0)$, where u, v, s and t are 4D coordinates of a light field, $u_0$, $v_0$, $s_0$, $t_0$ are the coordinates of the hypercone H and $u_0 t_0 = v_0 s_0$.

2. The method as in claim 1, wherein for a lenslet model, the 4-tuple of the hypercone H follows a relation, where:

$$u_0 = \left(\rho\cos\theta + r\frac{\sin\theta}{\cos\phi}\right)$$

$$v_0 = \left(\rho\sin\theta + r\frac{\cos\theta}{\cos\phi}\right)$$

$$s_0 = -D(-\sin\theta\tan\phi)$$

$$t_0 = -D(\cos\theta\tan\phi),$$

where $\theta$ and $\phi$ are plane $\pi$ parameterization angles defining the direction of a line L, D is a plane parameter that represents the distance from the view plane to sensor plane and $\rho$ is the distance from point Q to the origin O, and r is the distance from point Q to line R.

3. The method as in claim 1, wherein for a camera array model, the 4-tuple of the hypercone H follows a relation, where:

$$u_0 = D\left(-\sin\theta\tan\phi + \frac{\rho}{z_p}\cos\theta + \frac{r}{z_p}\frac{\sin\theta}{\cos\phi}\right)$$

$$v_0 = D\left(\cos\theta\tan\phi + \frac{\rho}{z_p}\sin\theta + \frac{r}{z_p}\frac{\cos\theta}{\cos\phi}\right)$$

$$s_0 = \rho\cos\theta + r\frac{\sin\theta}{\cos\phi}$$

$$t_0 = \rho\sin\theta + r\frac{\cos\theta}{\cos\phi},$$

where $z_p$ represents the distance from plane $\Omega$ to the view plane.

4. The method as in claim 1, wherein the k-th 4D block $B_k$ is a subset of a 4D light field in which:

$U_L^k \leq u \leq U_H^k; V_L^k \leq v \leq V_H^k; S_L^k \leq s \leq S_H^k; T_L^k \leq t \leq T_H^k$ wherein $U_L^k$, and $U_H^k$ correspond, respectively, to lower and upper limits of u dimension, $V_L^k$ and $V_H^k$ correspond, respectively, to lower and upper limits of v dimension, $S_H^k$ correspond, respectively, to lower and upper limits of s dimension, and $T_L^k$ and $T_H^k$ correspond, respectively, to lower and upper limits of t dimension.

5. The method as in claim 1, wherein a 4D region $\mathcal{R}_k^i$ is a causal region of type i of the k-th 4D block, with i={I, II, III, IV, V}, wherein:
$\mathcal{R}_k^I$ corresponds to the 4D region composed by a union of 4D blocks 1 to k−1, $U_{j=1}^{k-1} \mathcal{B}_k$,
$\mathcal{R}_k^{II}$ corresponds to an intersection of $\mathcal{R}_k^I$ with a hyperplane corresponding to u fixed,
$\mathcal{R}_k^{III}$ corresponds to an intersection of $\mathcal{R}_k^I$ with a hyperplane corresponding to v fixed,
$\mathcal{R}_k^{IV}$ corresponds to an intersection of $\mathcal{R}_k^I$ with a hyperplane corresponding to s fixed, and
$\mathcal{R}_k^V$ corresponds to an intersection of $\mathcal{R}_k^I$ with a hyperplane corresponding to t fixed.

6. The method as in claim 1, wherein within a codec loop, in which the prediction residual is encoded, a prediction mode is chosen among the 2D plane mode, the hypercone mode and the DC mode, where the prediction mode is chosen as being one that minimizes the Lagrangian cost of encoding residual and signaling a corresponding prediction mode.

7. The method as in claim 1, wherein the 2D plane mode exploits a mapping of a point in 3D space into a 4D light field, when points in 3D space imaged by 4D block $B_k$ belong to the same plane $\pi$ in 3D space, wherein the plane $\pi$ contains no directional texture.

8. The method as in claim 5, wherein the 2D plane mode is specified by plane parameters $\phi$, $\psi$, and d, where:

$$(\sin \psi)x + (\cos \psi \cos \phi)y - (\cos \psi \sin \phi)z = d$$

wherein (x,y,z) are the coordinates of point P on line L and d is the distance from plane $\pi$ to the origin O.

9. The method as in claim 1, wherein the prediction value P(u,v,s,t) of tuple (u,v,s,t) in the block $B_k$ is computed by:
projecting a corresponding ray from the light field to the plane $\pi$, and then projecting the projected corresponding ray back to each view that has pixels in the causal region $\mathcal{R}_k^I$;
calculating an intensity value of resulting projection by computing, for each view $(\tilde{s}, \tilde{t})$, that has pixels of coordinates $(\tilde{u}, \tilde{v}, \tilde{s}, \tilde{t})$ belonging to causal region $\mathcal{R}_k^I$, coordinates $(\hat{u}, \hat{v})$ of the pixel in view $(\tilde{s}, \tilde{t})$, wherein coordinates $(\hat{u}, \hat{v})$ are a function of $(u,v,s,t)(\tilde{s}, \tilde{t})$, $\phi$, $\psi$, and d, such as for the lenslet model:

$$\frac{z}{\hat{u} - x} = \frac{D}{\tilde{s}}$$
$$\frac{z}{\hat{v} - y} = \frac{D}{\tilde{t}}$$

and for the camera array model:

$$\frac{x - \tilde{s}}{z} = \frac{\hat{u}}{D} - \frac{\tilde{s}}{z_p}$$
$$\frac{y - \tilde{t}}{z} = \frac{\hat{v}}{D} - \frac{\tilde{t}}{z_p}$$

where the prediction value P(u,v,s,t) is an average of intensities $I(\hat{u}, \hat{v}, \tilde{s}, \tilde{t})$ of projections across all coordinates $(\hat{u}, \hat{v}, \tilde{s}, \tilde{t})$ that are in the causal region $\mathcal{R}_k^I$ of block $B_k$,
(x,y,z) are the coordinates of point P on line L, $z_p$ represents the distance from plane $\Omega$ to the view plane, and D is a plane parameter that represents the distance from the view plane to sensor plane.

10. The method as in claim 1, wherein the hypercone mode assumes that the region in 3D space being imaged is composed by a plane containing a directional texture, wherein the prediction parameters are the ones specifying the plane $\pi$ in 3D space, together with a parameter $\theta$ defining a direction of the texture in the 3D plane such as:

$$(\sin \psi \cos \theta - \cos \psi \sin \theta \cos \phi)x + (\sin \psi \sin \theta + \cos \psi \cos \theta \cos \phi)y + (-\cos \psi \sin \phi)z = d$$

where $\theta$ and $\phi$ are plane $\pi$ parameterization angles defining the direction of a line L, $\psi$ is the angle of plane $\pi$ with the plane defined by lines L and S, (x,y,z) are the coordinates of point P on line L and d is the distance from plane $\pi$ to the origin O.

11. The method as in claim 1, wherein for the lenslet model, all lines in plane $\pi$ that share the same parameters $\theta$ and $\phi$, give rise to hypercones in which $s_0$ and $t_0$, depend only on $\theta$ and $\phi$, wherein interception with a view (s,t) are parallel straight lines with angular coefficient $\eta$ in the space u×v is given by $\eta = (s - s_0)/(t - t_0)$, where $s_0$ and $t_0$ are coordinates of the hypercone H.

12. The method as in claim 1, wherein for the camera array model, all lines in plane $\pi$ that share the same parameters $\theta$ and $\phi$, give rise to hypercones whose interception with a view (s,t) give rise to straight lines in the plane u×v that pass through the point $(u^\circ, v^\circ)$ given by:

$$u^O = D\left(-\sin\theta\tan\phi + \frac{s}{z_p}\right)$$
$$v^O = D\left(\cos\theta\tan\phi + \frac{t}{z_p}\right),$$

where D is a plane parameter that represents the distance from the view plane to sensor plane and $z_p$ represents the distance from plane $\Omega$ to the view plane.

13. The method as in claim 1, wherein the interception of $H_i$, with an anchor view $(s^A, t^A)$ is a straight line $l_i^A$ in the u×v plane, where the prediction value is given by an average of the light f71 $_k^{II}$, $\mathcal{R}_k^{III}$, $\mathcal{R}_k^{IV}$, and $\mathcal{R}_k^{V}$, wherein the intensity values of the intersection is enabled to be estimated using subpixel interpolation.

14. The method as in claim 1, wherein the DC mode is one in which the 4D block $\mathcal{B}_k$ is predicted by an average of light field samples in a union of causal regions $\mathcal{R}_k^{II}$, $\mathcal{R}_k^{III}$, $\mathcal{R}_k^{IV}$, and $\mathcal{R}_k^{V}$, wherein the DC mode is likely to be used when an assumption that points in 3D space being imaged by the 4D block $\mathcal{B}_k$ approximately lie on a plane does not hold.

\* \* \* \* \*

UNITED STATES PATENT AND TRADEMARK OFFICE
CERTIFICATE OF CORRECTION

| | |
|---|---|
| PATENT NO. | : 11,647,225 B2 |
| APPLICATION NO. | : 17/352691 |
| DATED | : May 9, 2023 |
| INVENTOR(S) | : Eduardo Antonio Barros Da Silva et al. |

It is certified that error appears in the above-identified patent and that said Letters Patent is hereby corrected as shown below:

On the Title Page

Inventor Information, Item (72), Column 1, Line 1 delete "Antânio" and insert --Antônio--.

In the Claims

Column 16, Line 41 In Claim 13, delete "f71$_k^{II}$," and insert --field intensities along the intersection of the hypercone Hi with the union of the causal regions $\mathcal{R}_k^{II}$,--.

Signed and Sealed this
Fifteenth Day of August, 2023

Katherine Kelly Vidal
*Director of the United States Patent and Trademark Office*